United States Patent

[11] 3,598,471

[72] Inventors William J. Baldwin
West Roxbury, Mass.;
Jurgen R. Meyer-Arendt, Forest Grove, Oreg.
[21] Appl. No. 778,219
[22] Filed Nov. 22, 1968
[45] Patented Aug. 10, 1971
[73] Assignee Corning Glass Works
Corning, NY,

[54] OPTICAL CONTRAST ENHANCEMENT SYSTEM
7 Claims, 3 Drawing Figs.
[52] U.S. Cl. ................................................. 350/162,
350/160, 355/71
[51] Int. Cl. ....................................................... G02b 27/38
[50] Field of Search ............................................ 350/162,
160 P; 355/71

[56] References Cited
UNITED STATES PATENTS
2,805,599 9/1957 Pajes .......................... 355/71
3,085,469 4/1963 Carlson ...................... 350/162

3,278,449 10/1966 Hardwick et al. ............ 350/160 P
OTHER REFERENCES
Megla et al., Applied Optics, Vol. 5, No. 6., June 1966, PP 945— 960 (copy in 350/160 P)

Primary Examiner—David Schonberg
Assistant Examiner—Ronald J. Stern
Attorneys—Clarence R. Patty, Jr., Walter S. Zebrowski and William J. Simmons, Jr.

ABSTRACT: An optical system for enhancing the contrast of optical images. A sheet of photochromic material is disposed in the Fraunhofer diffraction or first Fourier transform plane of the optical system. Among the wavelengths of light transilluminating the object or transparency is a band which darkens the photochromic material especially at the center of the Fourier series display which contains contrast information (the zeroth order of the Fourier series display). This zeroth order term is attenuated to a much greater degree than the higher order terms which contain the information describing the object or transparency, thus producing an enhanced image.

PATENTED AUG 10 1971　　　　　　　　　　　　　3,598,471

INVENTORS.
William J. Baldwin
Jurgen R. Meyer-Arendt
BY William J. Simmons
ATTORNEY

OPTICAL CONTRAST ENHANCEMENT SYSTEM

BACKGROUND OF THE INVENTION

1. Field of the Invention

This invention relates to an optical system for processing optical data or images to change the contrast thereof in a controlled, variable manner, a technique generally known as spatial filtering. Spatial filtering enhances contrast in low-contrast images so that, for example, objects that differ primarily in phase can be made to appear like images of amplitude objects. It also causes an improvement and enhancement of the discernability and legibility of information displayed in optical systems of various kinds. This technique finds application in such fields as optical data processing, aerial reconnaissance, information transfer and the like. Some specific applications of this process are phase contrast and dark field microscopy.

Contrast, in general, can be defined as the ratio of the difference between maximum intensity, $I_{max}$ and minimum intensity, $I_{min}$ divided by the sum of these two intensities. A contrast equal to unity is the highest which can be obtained, while least contrast exists when $I_{max}$ equals $I_{min}$, in which case the contrast is zero. Spatial filtering is utilized to improve the contrast of an image, the contrast of which is between zero and unity.

Light which passes through a lens, or more generally, light which passes through an aperture, undergoes diffraction. Such diffraction results in a separation of the light into a zeroth order bundle (which passes straight through the aperture) and into higher order bundles (which are diffracted in varying degrees). With some simplification it may be said that the zeroth order contains most of the energy associated with the bias level or contrast of the object. This zeroth order, or undiffracted light is usually quite strong and must be attenuated in order to enhance the contrast. The information describing the object or signal is contained in the higher orders. These higher orders of light contain less energy, but since they contain the information, they must remain substantially unattenuated. Several methods of attenuating the zeroth order of light are known.

2. Description of the Prior Art

The term "object" will be used herein to refer to an object such as that encountered in the field of microscopy, a transparency such as a photographic negative or any other suitable means for producing an optical image. The term "sheet" will be used herein to refer to any optically suitable photochromic means such as a plate, film, sheet or the like.

In order to enhance the contrast of an object by the well-known principle of spatial filtering, a suitably shaped mechanical mask is usually inserted in the path of the light. An object, the contrast of which is to be enhanced, is illuminated by a collimated beam of light. The light passing through and diffracted by the low contrast object is divided into essentially two portions, a zeroth order of undiffracted light and higher orders of diffracted light. These two portions of light are then treated differently by the spatial filter, the zeroth order portion being attenuated. In accordance with conventional image-enhancing techniques this is accomplished by introducing a suitably shaped partially transmitting mask or opaque spot in the plane where the first Fourier series display of the light has been generated. This spot partially blocks the centrally located zeroth order while permitting the higher, information-containing orders of light to pass unimpeded. The contrast of the resultant image is enhanced in inverse proportion to the transmittance of the opaque spot. It is desirable to attenuate no orders except for the zeroth order, but this clearly cannot be realized in practice, because no stop can be made infinitesimally narrow. Furthermore, the spatial separation of the higher orders of light depends on the spacing of the details within the object and the relative intensities between the zeroth and higher orders vary with the refractive or phase characteristics thereof. Therefore, conventional methods for enhancing the images of a plurality of different objects require the insertion and removal of masks having different transmission characteristics. Moreover, to vary the contrast of the final image of any given object the spot mask must be removed and replaced by a different mask which must be registered to coincide with the zeroth order term. This is both tedious and time consuming. Furthermore, it is almost impossible to precisely register the spot mask so that it coincides with only the zeroth order term and does not attenuate higher orders of diffracted light.

A more complex optical spatial filter is disclosed in U.S. Pat. No. 3,085,469 issued to C. O. Carlson. In that patent, a spot mask is generated on a metichromic film in response to ultraviolet light from an auxiliary source. Precise alignment and size of the spot generated on the metichromic film is difficult to obtain in the spatial filter described in this patent.

SUMMARY OF THE INVENTION

An object of the present invention is to provide an improved system for enhancing the contrast of optical images.

Another object of this invention is to provide a spatial filter having automatic positioning of the zeroth order light-attenuating means.

Another object is to provide an optical system in which contrast enhancement takes place entirely by self-alinement and without auxiliary manipulations rendered by a human operator and without any mechanical, electro-optical or other type of servo system.

Another object is to provide an optical contrast enhancement system in which the contrast of the final image can be easily controlled and varied.

The objects of this invention are accomplished by providing a sheet of photochromic material in a first plane within the optical system. Means is provided for generating in the first plane a Fourier transform of an object. The Fourier transform arises from a first band of optical wavelengths which tends to darken the photochromic material and a second band of optical wavelengths which has little effect on the optical density of the photochromic material. The photochromic material remains substantially undarkened except for an area where the zeroth order of the Fourier transformation impinges thereon. Means are provided for converting the light emanating from the photochromic material into a real image.

Other objects, features and advantages of this invention will become apparent during the course of the following detailed description and the attached drawings, on which, by way of example, only the preferred embodiment of the present invention is illustrated.

DETAILED DESCRIPTION

Figure 1:
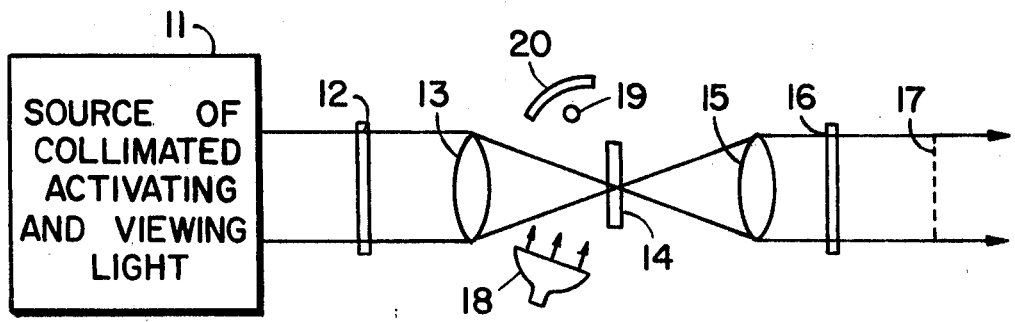
FIG. 1 shows a diagrammatic representation of a spatial filter utilizing photochromic material for the zeroth order light attenuator.

In the preferred embodiment shown in FIG. 1, a source 11 produces a collimated beam which contains two or more discrete wavelengths of light, one of which must be capable of activating or darkening photochromic material, the other being visible light or some other wavelength of light for viewing the results. The beam direction of all wavelenghts must be virtually identical. Satisfactory results are obtained when the collimated beam contains green light and blue and/or ultraviolet (UV) light. Blue and UV are optimum colors for darkening presently available photochromic materials while green tends to be the color that has least effect on the photochromic material, while at the same time green is efficiently attenuated by the photochromic materials that have been darkened. The green light is preferably of higher intensity since it will carry the information that is necessary for forming the final image. For simplicity it is assumed that the light is collimated, although other geometrical shapes may also be utilized. The intensity of the activating light must be capable of being regulated independently of the intensity of the viewing light. The light source 11 may consist of a xenon arc lamp or some similar point source, a filter and a collimator. The filter must pass green light and some blue or UV light. To change the amount of activating light in the collimated beam, the filter could be replaced by another which passes a different amount of activating light. The source 11 could also consist of two separate sources, one of which produces a collimated beam of activating light and the other of which produces a collimated beam of viewing light. The two beams are combined by a dichroic mirror into a single collimated beam. In this latter example the amount of activating light is continuously variable since it is generated by a separate source.

The collimated beam emanating from the source 11 transilluminates an object 12, the light emanating from the object being incident upon a lens 13. With the object effectively at infinity, the focal plane of the lens 13 is identical with the Fraunhofer diffraction plane or the first Fourier transform plane of that lens. A Fourier transform of the optical information contained in the collimated beam incident on the lens 13 will be projected onto this plane.

Figure 2:
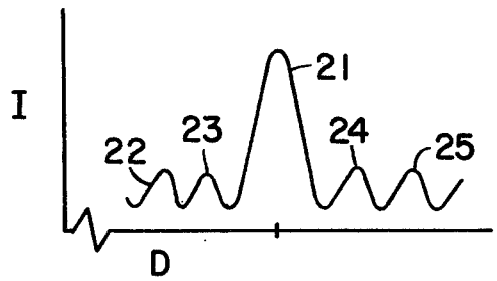
FIG. 2 is a graph which illustrates the light intensity plotted against the distance along a line which passes through the zeroth order of the Fourier transformation generated by the optical system of FIG. 1.

Fig. 2 is illustrative of the intensity distribution that exists at the central portion of the Fraunhofer diffraction plane. In this figure, the intensity I is plotted against the distance D along a line which passes through the center of the zeroth order of the Fourier transform. The light passing through the transparency 12 undergoes diffraction which is manifested at the focal plane of lens 13 by a separation of the light into a zeroth order bundle which is illustrated by the high peak 21 in the center of the intensity distribution curve and into higher order bundles which are represented by the lower peaks 22 through 25 on either side of the zeroth order peak. This zeroth order light, which contains contrast information, is usually quite strong and must be attenuated to enhance the contrast; however the higher orders of light, which contain information describing the object or transparency 12, must remain substantially unattenuated.

Attenuation of the zeroth order light is accomplished by disposing a sheet 14 of a photochromic material in the Fraunhofer diffraction plane. The preferred photochromic material for use in this invention is photochromic glass, the characteristics and production of which are described in U.S. Pat. No. 3,208,860 granted to W. H. Armistead and S. D. Stookey on Sept. 28, 1965. Photochromic glass has the property of becoming less transparent if irradiated with blue or UV light, remaining uneffected by green light and becoming more transparent if irradiated by red, infrared or orange light. The process by which photochromic glass is made less transparent will be referred to as activation, and the process whereby it is made more transparent will be referred to as bleaching. It is to be noted that after such glass has been activated, if the activating source is removed, the glass will naturally fade or become bleached, the rate of fading being proportional to the temperature of the glass.

Although photochromic glass is the preferred photochromic material, the tenebrescent material disclosed in U.S. Pat. No. 3,253,497 issued to J. N. Dreyer could also be used. Such tenebrescent materials include the alkali halides, numerous oxides, sulfides, sulfates, phosphates, nitrates, cyanides, and other inorganic compounds. Furthermore, the photochromic plate 14 may consist of a metachromic film of the type described in the aforementioned patent issued to C. O. Carlson.

Blue of UV light from the source 11 darkens the central portion of the photochromic plate due to the high intensity of the zeroth order light. Since the higher orders of light contain much less energy than the zeroth order light, the photochromic plate remains essentially undarkened thereby. The darkened portion in the center of the photochromic plate acts as a mask which attenuates the zeroth order area only, and the final image 17 will have gained contrast although its overall irradiance is somewhat reduced.

Light from the lens 13 undergoes another Fourier transformation which is performed by the lens 15. The result of such twice-repeated Fourier transformations is the formation of a real (and, in this case, inverted) image of the object which is represented by the dashed line 17. This image may be directly viewed, projected, photographed or otherwise utilized. If desired, the blue or UV light may be removed from the final image by a suitable filter 16.

The lens 13 should be achromatic for all of the source wavelengths used while the lens 15 should be achromatic for the imaging or viewing light used. For example, if the source 11 produced ultraviolet and green light, the image could be viewed by eye. For this case the lens 15 need operate only in the green, the UV light not being significant.

The efficiency and reliability of contrast enhancement depends on the accuracy with which the zeroth order, can be attenuated without unduly influencing the first orders and higher orders of the diffracted light. In the case of a simple object structure such as a grating, the separation of the orders is easily seen. For example, by simply looking into the tube of a phase contrast microscope, either without an eyepiece or by using an auxiliary telescope, the Fourier pattern can be seen. For objects of random shape, the situation is necessarily more complicated. The angular separation of the higher orders depends on the spacing of the details within the object. Very small objects such as bacteria produce quite different Fourier transforms than larger objects such as unstained cells. For optimum results, each different object requires that there be inserted in the first Fourier transform plane a partially transmitting mask of a given width and absorption.

The principle feature of the present invention is that contrast enhancement takes place entirely by self-alinement and without auxiliary manipulations rendered by a human operator and without any mechanical or electro-optical or other servosystem. The self-alignment feature is a direct consequence of utilizing materials, such as the photochromic glass sheet 14, which have the capability that their optical transmittance changes reversibly with the irradiance of actinic radiation incident thereupon. Contrary to prior art spatial filters which required the alignment of a spot mask with the zeroth order spot, the present invention utilizes radiation emanating from the object itself to produce an automatically centered zeroth order spot. Thus, an essentially unlimited variety of irregularly shaped objects can be viewed, each rendering itself visible at optimum contrast, no matter how different the spatial frequency distribution within the object.

A further advantage of the spatial filter of this invention arises from the fact that the characteristics thereof can be easily varied or modified. Three variables are available to control the optical density of the photochromic material. First, the power of the blue or UV radiation entering the system can be varied. Consequently, the darkening action can be balanced against the fading rate inherently present due to several conditions within the photochromic material. Secondly, the darkened central spot can be bleached by an auxiliary, off-axis red light source 18. Finally, the photochromic material can be heated externally to increase its fading rate. This latter method for regulating the optical density of the photochromic material is predicated upon the fact that photochromic materials exhibit the characteristic that their tendency to recover to the clear state is dependent upon the temperature of the glass, i.e. the rate of fading of photochromic glass is proportional to the temperature thereof. In FIG. 1, an infrared source 19 has a reflector 20 associated therewith, the reflector being so disposed as to direct infrared energy disposed the sheet 14 of photochromic material. Thus, by alternately or simultaneously heating the photochromic plate and irradiating it with activating light emanating from the object, the transmittance of the central spot and thereby the contrast in the final image can be varied. Any of these three techniques for varying the density of the photochromic material permit the achievement of high versatility and freedom from cumbersome manual alignment procedures associated with prior art spatial filters.

Furthermore, by balancing the activation rate of the photochromic material against the natural fade rate, the rate of optical bleaching and the thermal bleaching rate, a constant activation level in the photochromic material can be achieved. Many combinations of activation energy, bleaching energy and natural and thermal fade rates are possible.

The degree of contrast enhancement may also be varied by changing the wavelength of the light used for viewing the image. Since most photochromic materials are colored, they exhibit a greater density at one wavelength than at another. By changing the color of the light illuminating the object the amount of attenuation of the zeroth order spot and thus the contrast of the final image can be varied. Regardless of the choice of wavelengths for the viewing light, activation radiation must always be employed.

Figure 3:
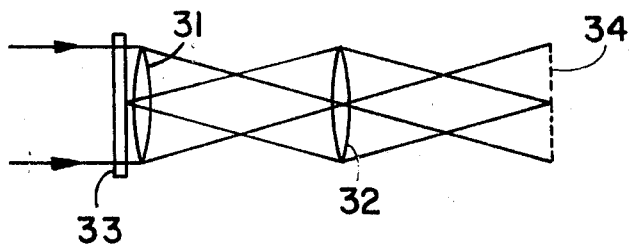
FIG. 3 shows a diagrammatic representation of an alternative embodiment of this invention.

In the alternative embodiment of FIG. 3 a lens 31 is utilized to perform a function similar to that performed by the lends 13 in FIG. 1. In this embodiment the photochromic plate is replaced by a lens 32 which is made from photochromic material. In the specific example illustrated in this figure, the focal length of the lens 31 is twice the focal length of the lends 32. The object 33 is placed as close as possible to the lens 31. The Fourier transform of the object appears in the focal plane of the lens 31 in which plane the lends 32 is disposed. The lens 32 therefore serves as a spatial filter as well as an image forming device. The lens 32 displays an image 34 of the object at a distance from its center of twice its focal length. By using the geometry shown in this figure, which utilizes the photochromic lens, the image-forming ability of the lens 32 has been combined with the dynamic filtering capabilities of the photochromic plate in the system of FIG. 1. Since the lens 32 becomes darkened in its center portion, it must be a relatively thin lens in order to maintain a high resolution.

We claim:

1. An optical system for enhancing the contrast of an object comprising light source means for providing a light beam containing at least some activating light, the wavelength of which is such that it increases the optical density of photochromic material at least some of the light in said beam being suitable for forming an image, the beam direction of all wavelengths of light in said beam being virtually identical, means for supporting said object in the path of said light beam, first lens means in the path of the light beam emanating from said object for generating at the back focal plane thereof the Fourier transform of said object, and a sheet of photochromic material disposed at the back focal plane of said first lens means, whereby that portion of said activating light, which relates to the contrast of said object and which therefore passes through the zeroth order portion of the Fourier transform, increases the optical density of said zeroth order portion to an extend greater than that to which the optical density of any other portion of said photochromic material is increased, the contrast of the image resulting from light passing through said photochromic material thereby being enhanced.

2. An optical system in accordance with claim 1 which further comprises means for bleaching said photochromic material.

3. An optical system in accordance with claim 1 wherein said mass of photochromic material and said means for converting comprise a lens of photochromic material.

4. An optical system in accordance with claim 1 wherein said light source means provides two separate wavelengths of light, one of which is an optimum wavelength for activating said photochromic material, the other being an optimum wavelength for viewing said contrast-enhanced image.

5. An optical system in accordance with claim 1 wherein said source provides a single band of wavelengths of light which activates said photochromic material and provides said contrast enhanced image.

6. An optical system in accordance with claim 1 further comprising second lens means in the path of the light emanating from said photochromic plate for forming the inverse Fourier transform of that appearing at the back focal plane of said first lens means.

7. An optical system in accordance with claim 6 which further comprises filter means disposed in the path of light emanating from said second lens means for passing only visible light.